US007412464B2

(12) United States Patent
Fienblit et al.

(10) Patent No.: US 7,412,464 B2
(45) **Date of Patent: *Aug. 12, 2008**

(54) ASYNCHRONOUS DATA MIRRORING WITH LOOK-AHEAD SYNCHRONIZATION RECORD

(75) Inventors: Shachar Fienblit, Ein Ayala (IL); Martin Tross, Haifa (IL); Aviad Zlotnick, D.N. Galil Takhton (IL)

(73) Assignee: International Business Machines Corporation, Armonk, NY (US)

(*) Notice: Subject to any disclaimer, the term of this patent is extended or adjusted under 35 U.S.C. 154(b) by 525 days.

This patent is subject to a terminal disclaimer.

(21) Appl. No.: 10/673,529

(22) Filed: Sep. 29, 2003

(65) Prior Publication Data

US 2005/0071388 A1 Mar. 31, 2005

(51) Int. Cl.
*G06F 12/00* (2006.01)
*G06F 17/30* (2006.01)

(52) U.S. Cl. ........................... 707/204; 707/200; 707/8; 711/113; 710/31

(58) Field of Classification Search ................... 710/31; 711/113, 162, 114; 707/204, 201, 200; 395/441
See application file for complete search history.

(56) References Cited

U.S. PATENT DOCUMENTS 5,550,998 A * 8/1996 Willis et al. ................. 711/114
6,269,431 B1 * 7/2001 Dunham ..................... 711/162
6,799,190 B1 * 9/2004 Boothby ..................... 707/204
6,978,324 B1 * 12/2005 Black .......................... 710/31
6,993,539 B2 * 1/2006 Federwisch et al. ......... 707/201
2003/0023808 A1 * 1/2003 Bakke et al. ................ 711/113

OTHER PUBLICATIONS

Non-Patent Literature: Minwen et al., "Seneca: remote mirroring done write", Proceedings of USENIX Technical Conference, (San Antonio, TX), Jun. 2003, USENIX, Berkley, CA.*

NPL: "Seneca: remote mirroring done write", Proceedings of USENIX Technical Conference, (San Antonio, TX), Jun. 2003, USENIX, Berkley, CA.*

Ji, Minwen et al., "Seneca: Remote Mirroring Done Write," Proceedings of USENIX Technical Conference, San Antonio, TX, pp. 253-268, Jun. 2003. USENIX, Berkley, CA.

* cited by examiner

*Primary Examiner*—Jean M. Corrielus
*Assistant Examiner*—Giovanna Colan

(57) ABSTRACT

A method for managing a data storage system includes maintaining a record predictive of locations to which data are to be written on the primary storage subsystem by a host processor. Upon receiving data from the host processor at the primary storage subsystem to be written to a specified location on the first non-volatile storage media, if the specified location is not included in the record, the record is updated responsively to the specified location. The primary storage subsystem signals the host processor that the data have been stored in the data storage system responsively to receiving the data and, if the specified location was not included in the record, responsively to updating the record.

14 Claims, 3 Drawing Sheets

26
20
28
38
22
STORAGE NODE A
MEM
CU
32
30
34
36
24
STORAGE NODE B
CU
MEM
30
32
34

32
34
40
44
42
58
56
54
60
52
46
50
48

HOST WRITES DATA ELEMENT E
70
SET OOS (E)
72
MOOS (E) SET ?
74
YES
NO
UPDATE MOOS
76
DESTAGE MOOS
78
ACKNOWLEDGE WRITE
80

76

SET MOOS (E)...MOOS (E+N)
90
M=NUMBER OF ELEMENTS SET IN MOOS AND CLEAR IN OOS AND CACHE
92
M > THRESHOLD ?
94
NO
TO STEP 78
YES
CLEAR LEAST RECENTLY SET BITS OF MOOS
96
TO STEP 78

ASYNCHRONOUS DATA MIRRORING WITH LOOK-AHEAD SYNCHRONIZATION RECORD

CROSS-REFERENCE TO RELATED APPLICATION

This application is related to U.S. patent application Ser. No. 10/673,733 filed on even date, entitled "Storage Disaster Recovery Using a Predicted Superset of Unhardened Primary Data", whose disclosure is incorporated herein by reference.

FIELD OF THE INVENTION

The present invention relates generally to data storage systems, and specifically to data mirroring for failure protection in storage systems.

BACKGROUND OF THE INVENTION

Data backup is a standard part of all large-scale computer data storage systems (and most small systems, as well). Data written to a primary storage medium, such as a volume on a local storage subsystem, are copied, or "mirrored," to a backup medium, typically another volume on a remote storage subsystem. The backup volume can then be used for recovery in case a disaster causes the data on the primary medium to be lost. Methods of remote data mirroring are surveyed by Ji et al., in an article entitled "Seneca: Remote Mirroring Done Write," *Proceedings of USENIX Technical Conference* (San Antonio, Tex., June, 2003), pages 253-268, which is incorporated herein by reference. The authors note that design choices for remote mirroring must attempt to satisfy the competing goals of keeping copies as closely synchronized as possible, while delaying foreground writes by host processors to the local storage subsystem as little as possible.

Large-scale storage systems, such as the IBM Enterprise Storage Server (ESS) (IBM Corporation, Armonk, N.Y.), typically offer a number of different copy service functions that can be used for remote mirroring. Among these functions is peer-to-peer remote copy (PPRC), in which a mirror copy of a source volume on a primary storage subsystem is created on a secondary storage subsystem. When an application on a host processor writes to a PPRC volume on the primary subsystem, the corresponding data updates are entered into cache memory and non-volatile storage at the primary subsystem. The control unit (CU) of the primary subsystem then sends the updates over a communication link to the secondary subsystem. When the CU of the secondary subsystem has placed the data in its own cache and non-volatile storage, it acknowledges receipt of the data. The primary subsystem then signals the application that the write operation is complete.

PPRC provides host applications with essentially complete security against single-point failures, since all data are written synchronously to non-volatile media in both the primary and secondary storage subsystems. On the other hand, the need to save all data in non-volatile storage on both subsystems before the host write operation is considered complete can introduce substantial latency into host write operations. In some large-scale storage systems, such as the above-mentioned IBM ESS, this latency is reduced by initially writing data both to cache and to high-speed, non-volatile media, such as non-volatile random access memory (RAM), in both the primary and secondary subsystems. The data are subsequently copied to disk asynchronously (an operation that is also referred to as "hardening" the data) and removed from the non-volatile memory. The large amount of non-volatile memory that must be used for this purpose is very costly.

Data mirroring functions are commonly classified as either "synchronous" or "asynchronous." In synchronous mirroring, all updates (data write operations) are propagated immediately to the secondary subsystem. This is generally the safest mode of operation, but also the slowest, since host writes are not acknowledged until the data have been stored in non-volatile media on both the primary and secondary subsystems. When asynchronous mirroring is used, on the other hand, hosts receive notification from the primary subsystem that a write is complete as soon as the data have been placed in the cache on the primary subsystem (or possibly after the data have been secured in non-volatile storage on the primary subsystem). The updates of the data are read out from the cache and sent to the secondary subsystem in a separate, background operation. The asynchronous approach gives better performance, in terms of response time to host writes, but is vulnerable to partial data loss in the case of failure.

SUMMARY OF THE INVENTION

The present invention provides methods for data mirroring that can be used to create storage systems that are immune to single-point failures, have low-latency write response, and permit rapid recovery after failure, without requiring special non-volatile memory or other costly components.

In embodiments of the present invention, when a host writes data to a primary storage subsystem, the primary subsystem stores the data in local non-volatile storage media, such as a disk, and copies the data to a secondary storage subsystem, which similarly stores the data. Upon recovery from a failure on the primary subsystem, certain data are copied back from the secondary subsystem to the primary subsystem in order to ensure that the two subsystems are synchronized, i.e., contain identical data at the corresponding locations in their storage media. To determine which data should be copied back from the secondary subsystem during recovery, the primary subsystem maintains a metadata record in non-volatile storage, which identifies the data locations that may be "out of sync" (i.e., may contain different data) on the primary and secondary subsystems.

The metadata record is maintained in such a way that the locations identified in this record constitute a predictive superset of the locations that are actually out of sync. Upon receiving data from a host to be written to a specified location (such as a particular track on disk), the primary subsystem checks whether the specified location is included in the metadata record. If not, the metadata record is updated to include the newly-specified location and, typically, to include additional locations to which the host is predicted to write subsequently. In this case, after updating the metadata record, the primary subsystem signals the host to acknowledge that the data have been stored. On the other hand, if the location of the write operation is already included in the metadata record, there is no need to update the metadata record, and the primary subsystem signals the acknowledgment to the host immediately. In this manner, operations on the non-volatile storage media are avoided, and the latency of the host write operation is accordingly reduced.

As the secondary subsystem receives and stores the data copied to it by the primary subsystem, it returns acknowledgment messages to the primary subsystem. The primary subsystem may then erase these locations from its metadata record, typically at the same time as it updates the record to add new locations. The size of the predicted superset may thus be controlled so as to achieve the desired balance between write latency (which becomes shorter as the predictive superset is enlarged) and recovery time (which becomes shorter as the superset is reduced).

Embodiments of the present invention are particularly suited for use in storage systems in which data are copied asynchronously from the primary to the secondary subsystem. In such systems, the primary subsystem signals the host that the write operation is complete as soon as it verifies that the current write location is included in the metadata record (including updating the record if required), irrespective of whether the data have been copied to the secondary subsystem. Maintaining this metadata record obviates the need for costly high-speed non-volatile memory to hold unhardened data, as in storage systems known in the art that use asynchronous data mirroring. On the other hand, the methods of the present invention may also be applied to keep track of data hardening and facilitate failure recovery in systems using synchronous copy services, particularly when such systems do not use high-speed non-volatile memory to hold unhardened data.

Although in the embodiments described herein, the predictive metadata record of locations to be copied during failure recovery is maintained on the primary subsystem, a similar record may, alternatively or additionally, be maintained on the secondary subsystem. Methods for maintaining and using such a record on the secondary subsystem are described, for example, in the above-mentioned related application.

There is therefore provided, in accordance with an embodiment of the present invention, a method for managing a data storage system that includes primary and secondary storage subsystems, including respective first and second non-volatile storage media, the method including:

maintaining a record predictive of locations to which data are to be written on the primary storage subsystem by a host processor;

receiving the data from the host processor at the primary storage subsystem to be written to a specified location on the first non-volatile storage media;

if the specified location is not included in the record, updating the record responsively to the specified location;

signaling the host processor that the data have been stored in the data storage system responsively to receiving the data and, if the specified location was not included in the record, responsively to updating the record;

copying the data from the primary storage subsystem to the secondary storage subsystem; and storing the data in the specified location on both the first and second non-volatile storage media.

Typically, copying the data includes transmitting the data between mutually-remote sites over a communication link between the sites. Additionally or alternatively, copying the data includes creating a mirror on the secondary storage subsystem of the data received by the primary storage subsystem. The method may then include, upon occurrence of a failure in the primary storage subsystem configuring the secondary storage subsystem to serve as the primary storage subsystem so as to receive further data from the host processor to be stored by the data storage system. Further alternatively or additionally, the method includes, upon recovery of the system from a failure of the primary storage subsystem, conveying, responsively to the record, a portion of the data from the secondary storage subsystem to the primary storage subsystem for storage on the primary storage subsystem.

In a disclosed embodiment, maintaining and updating the record include marking respective bits in a bitmap corresponding to the locations to which the data are to be written on the first and second non-volatile storage media.

In some embodiments, maintaining the record includes storing the record on the first non-volatile storage media, and wherein updating the record includes modifying the record that is stored on the first non-volatile storage media. Typically, modifying the record includes comparing the specified location to a copy of the record held in a volatile memory on the primary storage subsystem, modifying the copy of the record so that at least the specified location is included in the copy of the record, and destaging the modified copy of the record to the first non-volatile storage media. Preferably, the record is not modified on the first non-volatile storage media responsively to receiving the data as long as the specified location to which the data are to be written is included in the record. Typically, modifying the record includes adding a plurality of locations, including the specified location, to the record.

In an aspect of the invention, updating the record includes predicting one or more further locations to which the host processor is expected to write the data in a subsequent write operation, and adding the one or more further locations to the record. In one embodiment, predicting the one or more further locations includes selecting a predetermined number of consecutive locations in proximity to the specified location. In another embodiment, maintaining the record includes recording the locations to which the data are written using an object-based storage technique, and wherein predicting the one or more further locations includes choosing the one or more further locations based on a logical connection between storage objects.

Typically, updating the record includes removing one or more locations, other than the specified location, from the record, so as to limit a size of the record. In a disclosed embodiment, removing the one or more locations includes receiving an acknowledgment from the secondary storage subsystem that the data have been stored in the one or more locations on the second non-volatile storage media, and removing the one or more locations from the record responsively to the acknowledgment. Additionally or alternatively, removing the one or more locations includes identifying the locations at which the first and second non-volatile storage media contain substantially identical data, and selecting for removal one of the identified locations that was least-recently added to the record.

There is also provided, in accordance with an embodiment of the present invention, a data storage system, including:

a primary storage subsystem, which includes first non-volatile storage media; and a secondary storage subsystem, which includes second non-volatile storage media, wherein the primary storage subsystem is arranged to receive data from a host processor for writing to a specified location, and to store the data in the specified location on the first non-volatile storage media while copying the data to the second storage subsystem, which is arranged to store the data in the specified location on the second non-volatile storage media, and wherein the primary storage subsystem is arranged to maintain a record predictive of locations to which data are to be written on the primary storage subsystem by the host processor, and upon receiving the data from the host processor, to update the record responsively to the specified location if the specified location is not included in the record, and to signal the host processor that the data have been stored in the data storage system responsively to receiving the data and, if the specified location was not included in the record, responsively to updating the record.

There is additionally provided, in accordance with an embodiment of the present invention, a computer software product for use in a data storage system including primary and secondary storage subsystems, which include respective first and second control units and respective first and second non-volatile storage media, the product including a computer-readable medium in which program instructions are stored, which instructions, when read by the first and second control units, cause the first control unit to receive data from a host processor for writing to a specified location, and to store the data in the specified location on the first non-volatile storage media while copying the data to the second storage subsystem, and cause the second control unit to store the data in the specified location on the second non-volatile storage media, wherein the instructions further cause the first control unit to maintain a record predictive of locations to which data are to be written on the primary storage subsystem by the host processor, and upon receiving the data from the host processor, to update the record responsively to the specified location if the specified location is not included in the record, and to signal the host processor that the data have been stored in the data storage system responsively to receiving the data and, if the specified location was not included in the record, responsively to updating the record.

The present invention will be more fully understood from the following detailed description of the preferred embodiments thereof, taken together with the drawings in which:

DETAILED DESCRIPTION OF PREFERRED EMBODIMENTS

Figure 1:
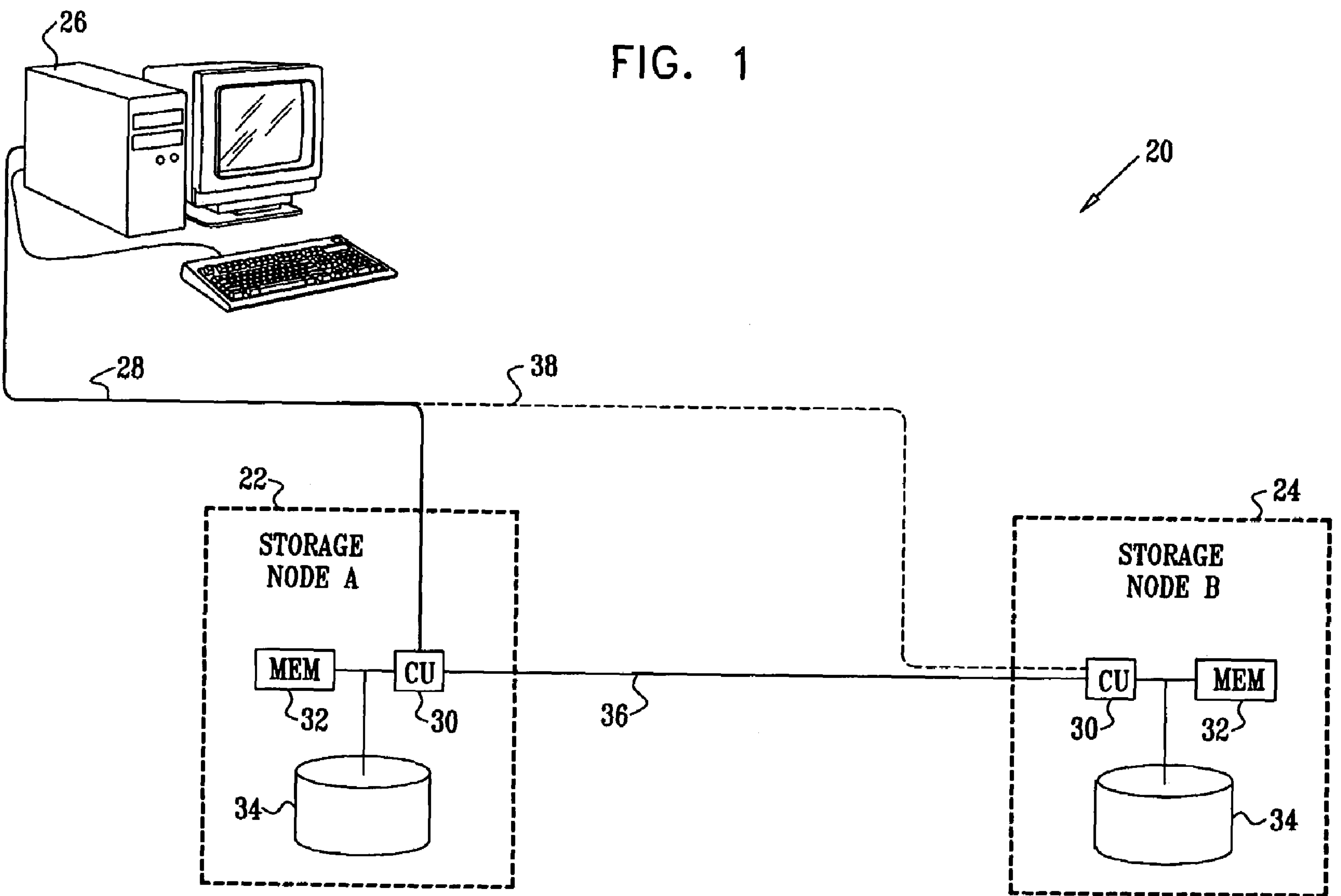
FIG. 1 is a block diagram that schematically illustrates a data storage system, in accordance with an embodiment of the present invention.

FIG. 1 is a block diagram that schematically illustrates a data storage system 20, in accordance with an embodiment of the present invention. System 20 comprises storage subsystems 22 and 24, which are labeled "storage node A" and storage node B" for convenience. In the description that follows, it is assumed that node A is configured as the primary storage subsystem, while node B is configured as the secondary storage subsystem for purposes of data mirroring. Thus, to write and read data to and from system 20, a host computer 26 (referred to alternatively simply as a "host") communicates over a communication link 28 with subsystem 22. Typically, link 28 is part of a computer network, such as a storage area network (SAN). Alternatively, host 26 may communicate with subsystem 22, over substantially any suitable type of serial or parallel communication link. Although for the sake of simplicity, only a single host is shown in FIG. 1, system 20 may serve multiple hosts. Typically, in normal operation, hosts may write data only to primary storage subsystem 22, but may read data from either subsystem 22 or 24.

Subsystems 22 and 24 may comprise substantially any suitable type of storage device known in the art, such as a storage server, SAN disk device or network-attached storage (NAS) device. Subsystems 22 and 24 may even comprise computer workstations, which are configured and programmed to carry out the storage functions described herein. Subsystems 22 and 24 may be collocated in a single facility or, for enhanced data security, they may be located at mutually-remote sites. Although system 20 is shown in FIG. 1 as comprising only a single primary storage subsystem and a single secondary storage subsystem, the principles of the present invention may be applied in a straightforward manner to systems having greater numbers of primary and/or secondary storage subsystems. For example, the methods described hereinbelow may be extended to a system in which data written to a primary storage subsystem are mirrored on two different secondary storage subsystems in order to protect against simultaneous failures at two different points.

Each of subsystems 22 and 24 comprises a control unit (CU) 30, typically comprising one or more microprocessors, with a cache 32 and non-volatile storage media 34. Typically, cache 32 comprises volatile random-access memory (RAM), while storage media 34 comprise a magnetic disk or disk array. Alternatively, other types of volatile and non-volatile media, as are known in the art, may be used to carry out the cache and storage functions of subsystems 22 and 24. The term "non-volatile storage media," as used in the context of the present patent application and in the claims, should therefore be understood to comprise collectively any and all of the non-volatile media that are available in a given storage subsystem, while "cache" or "volatile memory" comprises any and all of the volatile media. Control units 30 typically carry out the operations described herein under the control of software, which may be downloaded to subsystems 22 and 24 in electronic form, over a network, for example, or may be provided, alternatively or additionally, on tangible media, such as CD-ROM.

Subsystems 22 and 24 communicate between themselves over a high-speed communication link 36, which may be part of a SAN or other network, or may alternatively be a dedicated line between the two subsystems. Alternatively, control unit 30 and cache 32 of subsystem 24 may be collocated with subsystem 22, or located near subsystem 22, while storage media 34 of subsystem 24 are remotely located, as described in a U.S. patent application entitled, "Low-Cost Remote Data Mirroring" (IBM docket number IL9-2003-0033), filed on even date, whose disclosure is incorporated herein by reference.

Subsystem 24 may also be coupled to communicate with host 26, as well as with other hosts (not shown), over a communication link 38, similar to link 28. Link 38 enables subsystem 24 to serve as the primary storage subsystem in the event of a failure in subsystem 22. (In this case, some data may be lost. To ensure data consistency notwithstanding the data loss, the subsystems may be synchronized from time to time, and a concurrent copy—a "snapshot"—may be made of the stored data, as is known in the art. A bitmap may then be used to record changes since the last concurrent copy was made, and to update the data when switching back and forth between the primary and secondary subsystems after failure and subsequent recovery.) It will be thus be observed that the capabilities of the primary and secondary storage subsystems are substantially identical, and the functional designations "primary" and "secondary" are arbitrary and interchangeable. Optionally, subsystem 22 may serve as the primary subsystem for some hosts, while subsystem 24 serves as the primary subsystem for others, at the same time as it serves as the secondary subsystem for backup of subsystem 22.

In the embodiments described below, it is assumed that system 20 is configured for asynchronous data mirroring. In other words, upon receiving data from host 26 to be written to subsystem 22, control unit 30 writes the data to cache 32, and then signals the host to acknowledge the write operation without waiting for the data to be copied to secondary subsystem 24. Control unit 30 then stores the data on its local storage media 34 and transmits the data over link 36 to subsystem 24 for mirror (backup) storage. After storing the data at the appropriate locations on its own storage media 34, control unit 30 of subsystem 24 sends an acknowledgment back to subsystem 22. The data mirroring on subsystem 24 is thus carried out asynchronously and independently of the completion of the write operation between host 26 and subsystem 22.

Figure 2:
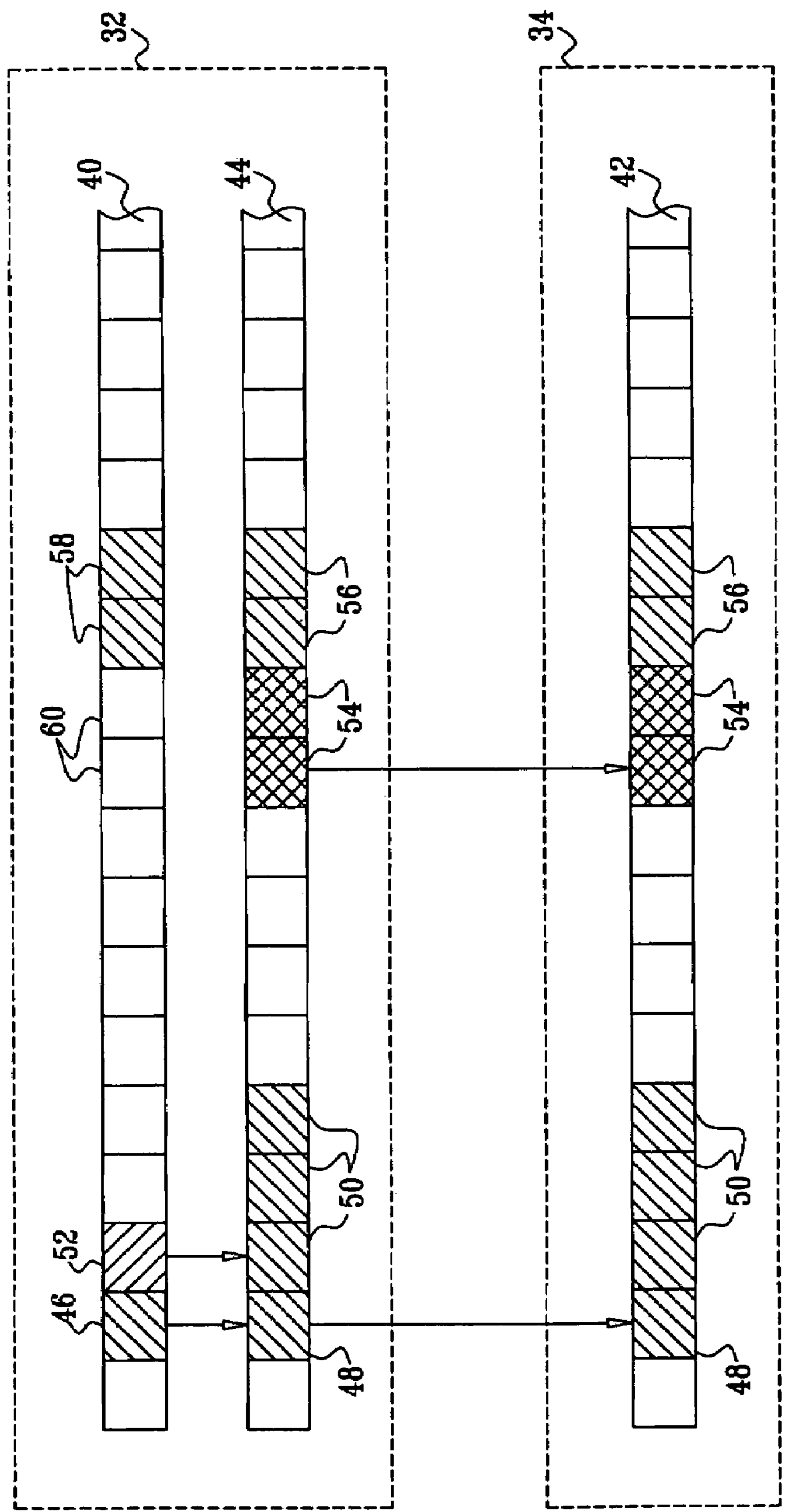
FIG. 2 is a schematic representation of bitmaps used in tracking data storage, in accordance with an embodiment of the present invention.

FIG. 2 is a schematic representation of bitmaps 40, 42 and 44, which are maintained on subsystem 22 for tracking data storage in system 20, in accordance with an embodiment of the present invention. Bitmaps 40, 42 and 44 are metadata records, which are used by subsystem 22 in recording the locations at which the data on storage media 34 in subsystems 22 and 24 are or may be out of sync. Each bit represents a different location. Typically, when storage media 34 comprise disks, each bit in the bitmaps corresponds to a disk track, but the bits (and the corresponding locations) may alternatively correspond to different sorts of data elements, of finer or coarser granularity. Furthermore, although the bitmaps described here are a convenient means for maintaining metadata records, other types of data structures may similarly be used for the purposes of the present invention, as will be apparent to those skilled in the art.

Bitmap 40, which is held in cache (volatile memory) 32 on subsystem 22, indicates the locations on storage media 34 in subsystem 22 that are out of sync with the corresponding locations on the storage media in subsystem 24. In other words, control unit 30 of subsystem 22 sets a bit in bitmap 40 when it receives data from host 26 to be stored in the corresponding storage location. The control unit of subsystem 22 sends the data over link 36 to subsystem 24, and clears the bit in bitmap 40 when it receives an acknowledgment from subsystem 24 that the data have been stored at the specified location. Bitmap 40 is therefore referred to as the "out-of-sync" (OOS) bitmap. Clearly, if subsystem 22 fails and then subsequently recovers, any locations marked by bits that were set in bitmap 40 at the time of failure must be copied back from subsystem 24 to subsystem 22 in order to synchronize storage media 34 on the two subsystems. Bitmap 40, however, is maintained in volatile memory, and may therefore be lost in the case of a power outage or other disastrous failure of subsystem 22. It is possible to maintain bitmap 40 in non-volatile storage media 34, but this alternative would require control unit 30 in subsystem 22 to access media 34 every time it transmits data to or receives an acknowledgment from subsystem 24. These frequent accesses to the storage media would add considerably to the overhead, and hence the latency, of write operations.

To address this problem, control unit 30 maintains bitmap 42 in storage media 34. As can be seen in FIG. 2, the bits that are set in bitmap 42 are a superset of the bits set in bitmap 40. Therefore, bitmap 42 is referred to as the "maybe-out-of-sync" (MOOS) bitmap. A copy of the contents of bitmap 42 may also be held in bitmap 44 in cache 32. Upon recovery of subsystem 22 from a failure, control unit 30 in subsystem 22 reads bitmap 42 from storage media 34, in order to determine the tracks that are to be copied back to subsystem 22 from subsystem 24. It requests that subsystem 24 transmit back the contents of these tracks, along with any other tracks that changed on subsystem 24 while subsystem 22 was out of service (if, for example, subsystem 24 was used as the primary storage subsystem during the failure and received write operations from host 26). During normal operation, control unit 30 selects the bits to be set in bitmap 42 in such as way as to limit the frequency with which the control unit must access storage media 34 to update bitmap 42, while still ensuring that all bits set in bitmap 40 are also set in bitmap 42. To achieve this objective, control unit 30 chooses the bits to set in bitmap 42 using a predictive method, as described hereinbelow.

Figure 3:
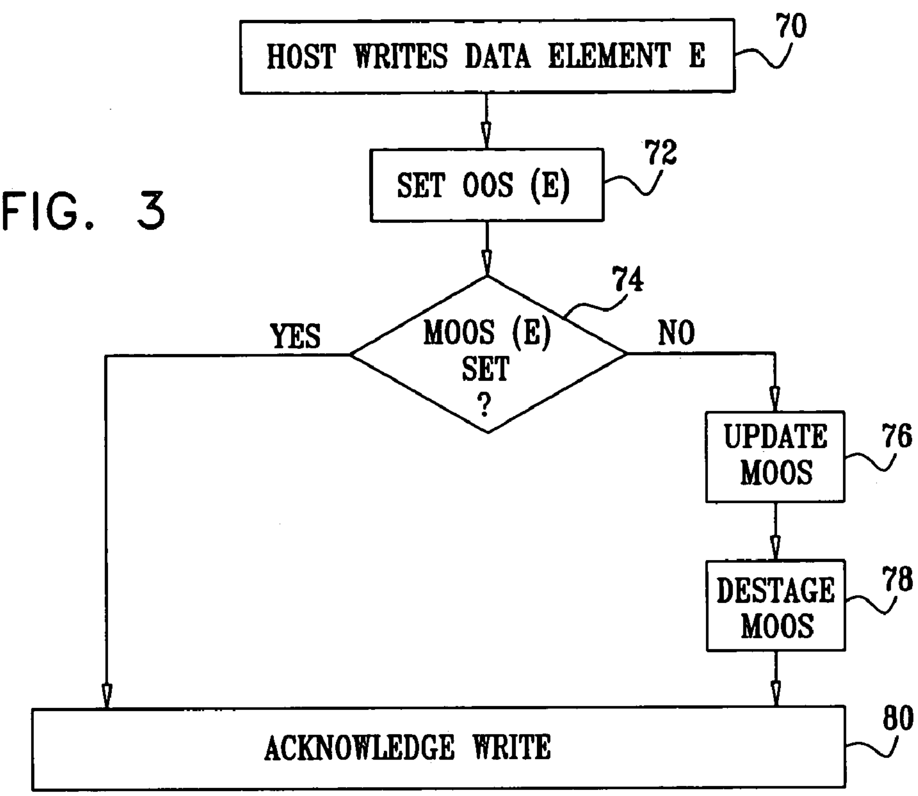
FIG. 3 is a flow chart that schematically illustrates a method for tracking data storage, in accordance with an embodiment of the present invention.

FIG. 3 is a flow chart that schematically illustrates a method for tracking data storage on system 20, in accordance with an embodiment of the present invention. The method uses bitmaps 40, 42 and 44, as shown in FIG. 2, and is described with reference to these bitmaps. Control unit 30 of subsystem 22 initiates the method whenever host 26 writes data to a specified location on subsystem 22, at a host writing step 70. The location is denoted here as "track E." Control unit 30 places the data in its cache 32, and sets a bit 46 in bitmap 40, referred to as OOS(E), to indicate that track E on subsystem 22 is out of sync with corresponding track on subsystem 24, at an OOS setting step 72. The control unit hardens the data from cache 32 to storage media 34, and also transmits the data to subsystem 24 for storage there, in processes that take place in background, asynchronously with the host write operation and metadata manipulations that are described here. When subsystem 24 returns an acknowledgment to subsystem 22, indicating that it has hardened the data stored in a certain track or tracks, control unit 30 on subsystem 22 clears the corresponding bit or bits in bitmap 40.

After setting OOS(E) (bit 46) in bitmap 40, control unit 30 checks bitmap 44 to determine whether the corresponding bit, referred to as MOOS(E), is set in bitmap 44 (and thus in bitmap 42, as well), at a MOOS checking step 74 if MOOS (E), represented in FIG. 2 by a bit 48, is not set in bitmap 44, control unit 30 updates bitmap 44, at a MOOS update step 76. Typically, when the control unit updates the bitmap, it sets not only MOOS(E) (bit 48), but also a group of bits 50, corresponding to tracks to which host 26 is predicted to direct its subsequent write operations. Any suitable prediction algorithm may be used to select bits 50. For example, bits 50 may comprise the next N bits (in the present example, N=3) in bitmap 42 following MOOS(E), as shown in FIG. 2. Control unit 30 may decide at the same time to clear some of the bits in bitmap 44 (for which the corresponding bits in bitmap 40 are not set), as described below.

The updated bitmap 44 is then destaged, i.e., copied to bitmap 42 on media 34, at a MOOS destaging step 78. Typically, bitmaps 40, 42 and 44 are divided up into several segments (not shown in the figures), each corresponding to a different set of tracks or other storage locations. In this case, only the specific segment (or segments) of bitmap 44 in which bits have been updated at step 76 is destaged at step 78. Alternatively, the entire bitmap may be destaged at this step if appropriate. In either case, only after destaging is complete does control unit 30 signal host 26 to acknowledge that the write operation is complete, at a write acknowledgment step 80.

On the other hand, if control unit 30 finds at step 74 that MOOS (E) is set, there is no need to update and destage bitmaps 42 and 44, and the process therefore continues directly to step 80. For example, after writing to the track corresponding to bit 46, host 26 may continue writing to the next track, which corresponds to a bit 52 in bitmap 40. Upon receiving this next host write at step 70, control unit 30 sets bit 52. Because of the prediction carried out at the previous pass through step 76, however, the corresponding bit (one of bits 50) is already set in bitmaps 42 and 44. Thus, no further operations are required on these bitmaps at this stage, and this write operation is completed without modifying bitmap 42 on disk.

Figure 4:
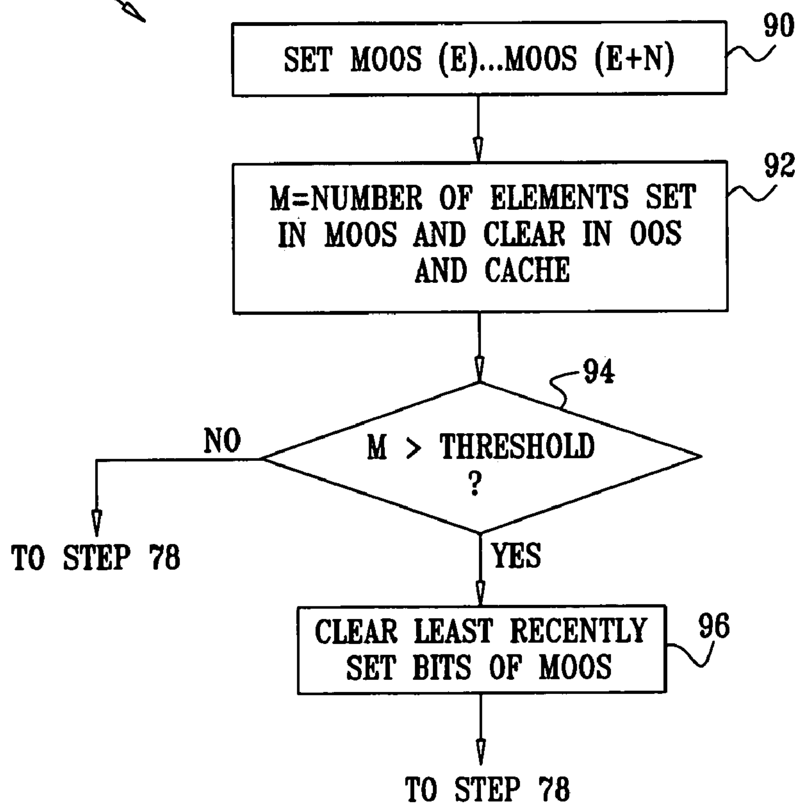
FIG. 4 is a flow chart that schematically illustrates a method for maintaining a predictive metadata record, in accordance with an embodiment of the present invention.

FIG. 4 is a flow chart that schematically shows details of MOOS update step 76, in accordance with an embodiment of the present invention. As noted above, when control unit 30 determines at step 74 that MOOS(E) is not set, the control unit sets MOOS(E), and also predicts the next tracks to which host 26 is likely to write and sets the corresponding bits in bitmap 44, at a prediction step 90. In the present example, the control unit sets bits MOOS(E) through MOOS(E+N). The number of predicted bits to set, N, is chosen so as to strike the desired balance between low latency (achieved when N is large) and rapid failure recovery (achieved when N is small, since in this case a relatively smaller number of tracks will be copied from subsystem 24 to subsystem 22 during recovery).

Alternatively, other methods may be used to choose the bits that are to be set in bitmap 44 at step 90. For example, a certain number of bits prior to bit E may be set, in addition to or instead of the bits following E. As another example, after setting each new bit in bitmap 40 at step 72, control unit 30 may modify bitmap 44 so that it contains at least N set bits following the current MOOS(E). In this case, the control unit would, for example, after setting bit 52 in bitmap 40, set one more bit in bitmap 44 following bits 50. The control unit still destages bitmap 44 to bitmap 42, however, only when it finds at step 74 that MOOS(E) is not set in bitmap 42. For this purpose, control unit 30 may keep two bitmaps in cache 32: an old MOOS bitmap, corresponding to bitmap 42, and a new MOOS bitmap, containing the changes to be made at the next destaging. Upon destaging the new MOOS bitmap at step 78, the contents of the old MOOS bitmap in cache 32 are replaced by the new MOOS bitmap. Alternatively, control unit 30 may use lists or other data structures, as are known in the art, to keep track of the current contents of bitmap 42 and of the updates waiting to be made in the bitmap.

As yet another example, control unit 30 may employ object-based storage techniques to track the storage locations that are out of sync and to predict the locations to which host 26 is likely to write next. In object-based storage, the control unit is aware of associations between storage locations and logical objects. Thus, at step 90, control unit 30 may use logical connections between the logical objects to determine which bits to set in MOOS bitmap 44. For instance, if the logical objects are pages written in Hypertext Markup Language (HTML), the control unit may, upon receiving data to be written to a first HTML page, set bits in bitmap 44 corresponding to other HTML pages to which the first page has hyperlinks.

Returning now to FIG. 4, as host 26 continues to write data to system 20, more new bits will continue to be set in bitmap 42 at steps 76 and 78. The greater the number of bits that are set in bitmap 42, while the corresponding tracks on subsystems 22 and 24 are not actually out of sync, the larger the number of tracks that will be unnecessarily copied from subsystem 24 to subsystem 22 during recovery from failure. In order to limit the number of tracks that are copied unnecessarily, control unit 30 may choose certain tracks to be cleared in bitmap 42, at a bitmap checking step 92. The tracks that may be cleared are generally those that do not contain unhardened data in cache 32 of subsystem 22 (i.e., the tracks are "clean" in cache 32), and whose corresponding bits are set in bitmap 44 but not in bitmap 40 (meaning that the data stored in these tracks on subsystems 22 and 24 are substantially identical).

Referring back to FIG. 2, for example, bits 54 and 56 are set in bitmaps 42 and 44, and bits 58 are set in bitmap 40. Bits 60, however, are clear in bitmap 40, possibly because subsystem 24 has already stored the data in the corresponding tracks and returned a corresponding acknowledgment to subsystem 22, causing control unit 30 to clear these bits. Bits 54 therefore need not remain set in bitmaps 42 and 44, and may be cleared.

Control unit 30 counts the total number of the unnecessarily-set bits, M, in bitmap 44, and compares this value to a predetermined threshold, at a bitmap evaluation step 94. As long as M is below the threshold, there is no need to clear any of the bits in bitmap 42 before destaging at step 78. The threshold is chosen to give the desired balance between low write latency (high threshold) and rapid failure recovery (low threshold). On the other hand, if M is above the threshold, control unit 30 clears some of the unnecessarily-set bits in bitmap 42 before destaging, at a bit clearing step 96, so that the number of unnecessarily-set bits remaining after this step will be less than the threshold. The bits that are cleared are selected from among those whose corresponding tracks in cache 32 are clean and whose corresponding bits in bitmap 40 are clear. For example, bits 54 in bitmap 44 may be cleared at this step. Typically, control unit 30 keeps a list or other record of the respective times at which the bits in bitmap 42 were set, and clears the unnecessarily-set bits that were least-recently set. Alternatively, other criteria may be used to choose the bits to clear at this step. Destaging then proceeds at step 78.

Although the embodiments described above relate to asynchronous mirroring, the methods described above may be adapted, mutatis mutandis, for use in synchronous remote mirroring in system 20 and in other data storage systems. When synchronous mirroring is used, a predictive record, such as bitmap 44, may be used to keep track of data that have been written to cache 32 on either or both of subsystems 22 and 24, but which have not yet been hardened to disk. The bitmap will then indicate the data that may have been lost in the case of a failure of one of the subsystems. Thus, synchronization of data can be maintained without requiring the use of high-speed non-volatile memory.

Additionally or alternatively, in a data storage system using asynchronous mirroring, a predictive record similar to bitmap 42 may be maintained on secondary subsystem 24. Methods for maintaining and using such a record on the secondary subsystem are described in the above-mentioned related application Ser. No. 10/673,733. In alternative embodiments of the present invention, particularly when the predictive record is maintained on the secondary subsystem, the record may be held in volatile memory, in addition to or instead or holding it in non-volatile memory as described above.

It will thus be appreciated that the preferred embodiments described above are cited by way of example, and that the present invention is not limited to what has been particularly shown and described hereinabove. Rather, the scope of the present invention includes both combinations and subcombinations of the various features described hereinabove, as well as variations and modifications thereof which would occur to persons skilled in the art upon reading the foregoing description and which are not disclosed in the prior art.

The invention claimed is:

1. A method for managing a data storage system that includes primary and secondary storage subsystems, including respective first and second non-volatile storage media, the method comprising:

maintaining a record of locations to which data are expected to be written on the primary storage subsystem by a host processor, as indicated by a predetermined prediction algorithm based on the locations to which the data have already been written;

receiving the data from the host processor at the primary storage subsystem to be written to a specified location on the first non-volatile storage media;

if the specified location is not included in the record, updating the record using the prediction algorithm so that the record includes both the specified location and one or more further locations that have not yet been specified by the host processor;

outputting an acknowledgment to the host processor to indicate that the data have been stored in the data storage system after receiving the data and after updating the record if the specified location was not included in the record prior to updating the record;

copying the data from the primary storage subsystem to the secondary storage subsystem so as to create a mirror on the secondary storage subsystem of the data received by the primary storage subsystem;

storing the data in the specified location on both the first and second non-volatile storage media; and upon recovery of the system from a failure of the primary storage subsystem, conveying, responsively to the record, a portion of the data from the secondary storage subsystem to the primary storage subsystem for storage on the primary storage subsystem.

2. The method according to claim 1, wherein copying the data comprises transmitting the data between mutually-remote sites over a communication link between the sites.

3. The method according to claim 1, and comprising, upon occurrence of a failure in the primary storage subsystem, configuring the secondary storage subsystem to serve as the primary storage subsystem so as to receive further data from the host processor to be stored by the data storage system.

4. The method according to claim 1, wherein maintaining and updating the record comprise marking respective bits in a bitmap corresponding to the locations to which the data are to be written on the first and second non-volatile storage media.

5. The method according to claim 1, wherein maintaining the record comprises storing the record on the first non-volatile storage media, and wherein updating the record comprises modifying the record that is stored on the first non-volatile storage media.

6. The method according to claim 5, wherein modifying the record comprises:

comparing the specified location to a copy of the record held in a volatile memory on the primary storage subsystem;

modifying the copy of the record so that at least the specified location is included in the copy of the record; and destaging the modified copy of the record to the first non-volatile storage media.

7. The method according to claim 6, wherein the record is not modified on the first non-volatile storage media responsively to receiving the data as long as the specified location to which the data are to be written is included in the record.

8. The method according to claim 5, wherein modifying the record comprises adding a plurality of locations, including the specified location, to the record.

9. The method according to claim 1, wherein updating the record comprises predicting one or more further locations to which the host processor is expected to write the data in a subsequent write operation, and adding the one or more further locations to the record.

10. The method according to claim 9, wherein predicting the one or more further locations comprises selecting a predetermined number of consecutive locations in proximity to the specified location.

11. The method according to claim 9, wherein maintaining the record comprises recording the locations to which the data are written using an object-based storage technique, and wherein predicting the one or more further locations comprises choosing the one or more further locations based on a logical connection between storage objects.

12. The method according to claim 1, wherein updating the record comprises removing one or more locations, other than the specified location, from the record, so as to limit a size of the record.

13. The method according to claim 12, wherein removing the one or more locations comprises receiving an acknowledgment from the secondary storage subsystem that the data have been stored in the one or more locations on the second non-volatile storage media, and removing the one or more locations from the record responsively to the acknowledgment.

14. The method according to claim 12, wherein removing the one or more locations comprises identifying the locations at which the first and second non-volatile storage media contain identical data, and selecting for removal one of the identified locations that was least-recently added to the record.

* * * * *